United States Patent [19]

Fisher

[11] 3,765,371

[45] Oct. 16, 1973

[54] ANIMAL LITTER

[76] Inventor: Stanton E. Fisher, c/o P.O. Box 6825, Brentwood, Mo. 63144

[22] Filed: Mar. 1, 1971

[21] Appl. No.: 119,944

[52] U.S. Cl. .................................................. 119/1
[51] Int. Cl............................................. A01k 67/00
[58] Field of Search ......................................... 119/1

[56] References Cited
UNITED STATES PATENTS

| | | | |
|---|---|---|---|
| 3,565,040 | 2/1971 | Pohl | 119/1 |
| 3,425,397 | 2/1969 | Schulein | 119/1 |
| 3,286,691 | 11/1966 | McFadden | 119/1 |
| 3,029,783 | 4/1962 | Sawyer | 119/1 |
| 3,066,646 | 12/1962 | Bramley | 119/1 |

Primary Examiner—Aldrich F. Medbery
Attorney—Sidney B. Ring

[57] ABSTRACT

A system for animal excrement control which comprises the use of plastics such as foamed plastics capable of adsorbing and/or absorbing excrement. Animal litter so made may be employed as such, or may be impregnated with an additive such as a bactericide, an antioxidant, a deodorizer, chlorophyl, etc., surfactants to make the plastic more adsorbing and/or absorbing, etc., dyes to give the desired color, etc.

The foamed plastic, preferably employed in the form of small particles, may be employed alone or in conjunction with other types of animal litter such as clays, bentonites, chlorophyl-containing litters such as dehydrated grasses, for example alfalfa, etc.

9 Claims, No Drawings

ANIMAL LITTER

This invention relates to excrement control and more particularly to animal excrement control.

There are in present use a wide variety of products for the disposition of animal excrement. One widely used product is known as "Animal Litter" which describes a wide variety of high surface materials such as clay, bentonites, Fullers Earth, vermiculite, diatomaceous earth, etc. in various forms and combinations. These products have certain deficiencies. For example, they are very heavy per unit of absorbing and/or adsorbing volume and are therefore extremely expensive to ship from source to consumer. Some, such as alfalfa, are biodegradable so that they break down in use, thus precluding reuse, if desired.

Since the location of various sources of supply of the animal litter material are far removed from the location of use, the heavy weight of litter material greatly increases the costs of production and distribution.

I have now devised an excrement control system which is characterized by the use of plastic materials of high surface area which has the ability of effectively absorbing and/or adsorbing excrement. One type of plastic material which can be employed is foamed plastic. Such materials have high surface areas which are very effective in absorbing and/or adsorbing excrement. They have a low weight per unit of absorbing/adsorbing volume, thus minimizing the costs of shipping and distribution.

The foamed plastic can be employed in any suitable form such as pellets, balls, chunks, blocks, sheets, etc. or combinations thereof. They can be sold in any suitable container and being light they can be handled with ease.

Where particle size is important such as with cats who like to cover their excrement, particle sizes of about 1/16 to ½ inch, for example from about ⅛ to ⅜ inch, but preferably about ¼ inch ± 1/16 inch can be employed. Larger or smaller particles can also be employed in certain instances.

A wide variety of foamed plastics can be employed provided such plastics are capable of adsorbing and/or absorbing excrement. In general, the foamed plastic should itself be hydrophilic or be rendered hydrophilic by treatment, i.e. capable of absorbing and/or adsorbing aqueous materials.

The following are non-limiting examples:

Polystyrene, polyurethanes, phenolic resins, polyvinylchloride, cellular cellulose acetate, etc. Mixtures of foamed plastics can also be employed.

In order to increase their hydrophilic properties it is often desirable to treat the foamed plastic with surfactants capable of rendering the foamed plastic more hydrophilic, i.e., water absorptive and/or adsorptive. In addition, certain bactericides serve a dual function, i.e., they not only prevent decomposition of the wastes to odiferous products but also render the surface of the foamed plastic more hydrophilic.

For example — a bactericide such as

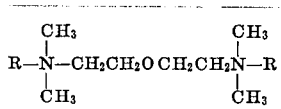

where R is a hydrocarbon group (such as $C_8$ to $C_{18}$) acts as both a bactericide and a surfactant.

Suitable hydrophilic surfactants or wetting agents are those conventionally employed in home and industry for washing dishes, clothes, as janitorial, etc., materials.

A typical surfactant is an oxyalkylated alkylphenol such as oxyethylated nonylphenol, for example

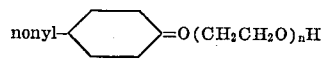

A typical antioxidant is 6-ethoxy-1,2-dihydro-2,2,4-trimethyl quinoline.

Bactericides, antioxidants, deodorants are employed to prevent or mask odors. Bactericides and antioxidants do so by inhibiting the breakdown of excrement into odiferous products. For esthetic reasons it may be advantageous to dye the foamed plastic any desirable color such as green to indicate freshness, brown to obscure the color of the animal excrement, a color to indicate source, i.e., in the nature of a trademark, etc.

After use, the foamed plastic can be disposed of, or if desired can be washed, dried and reused, thus reducing the cost of use.

One method of reducing odors is to spray the plastic with chlorophyl or any other suitable odor reducer or masker which is not offensive to the animal. The plastic pellets may also be dyed to any suitable color.

In addition, the foamed plastic may also be admixed with suitable amounts of other animal litters such as clays, bentonites, alfalfa, etc., in ratios of from about 1 to 50 percent by volume or more of the non-plastic material, such as from 5 — 40%, but preferably employed from 10 — 25%.

The following Examples are presented by way of illustration and not of limitation.

EXAMPLE 1

Small pellets of about ¼ inch foamed polystyrene treated with a wetting agent are placed in a container having the following dimensions: Two feet by one and one-half feet to a depth of 1.5 — 2 inches. This system is employed as an animal litter.

EXAMPLE 2

Example 1 is repeated except that the foamed polystyrene is pretreated with a bactericide. This system is employed as animal litter.

EXAMPLE 3

Small pellets of foamed polyurethane pretreated with a wetting agent are set up in the manner of Example 1 and employed as animal litter.

EXAMPLE 4

Example 3 is repeated except that the foamed polyurethane is pretreated with a bactericide to yield an animal litter.

EXAMPLE 5

After use, the foamed polystyrene pellets of Example 1 are washed with water containing a small amount of bleach water, then dried, treated with a wetting agent and reused as animal litter.

EXAMPLE 6

After use, the foamed polystyrene pellets of Example 2 water washed with water containing a small amount of bleach water, are dried and then retreated with a bactericide to yield an animal litter.

EXAMPLE 7

Example 5 is repeated except that foamed polyurethane is employed. The washed polyurethane treated with a wetting agent yields an animal litter.

EXAMPLE 8

Example 6 is repeated except that foamed polyurethane is employed. The washed polyurethane is again treated with a bactericide to give an animal litter system.

EXAMPLE 9

A sheet of foamed polyurethane is placed in a box as a base and ¼ inch foamed phenolic resin pellets treated with a wetting agent are placed thereon to yield an animal litter system.

EXAMPLE 10

Example 9 was repeated except that a polystyrene sheet and polystyrene pellets (¼ inch) are employed to yield an animal litter.

EXAMPLE 11

After use, the system of Example 9 is washed with bleach water solution treated with a wetting agent and reused.

EXAMPLE 12

After use, the system of Example 10 is washed with bleach water solution, retreated with bactericide and then reused.

EXAMPLE 13

Example 1 is repeated except that the plastic pellets are sprayed with a chlorophyl solution containing a green dye to yield an animal litter.

EXAMPLE 14

Examples 1 and 2 are repeated except that the system contains 25% by volume of dehydrated alfalfa to yield an animal litter.

EXAMPLE 15

Examples 1 and 2 are repeated except that the system contained 25% by volume of a commercial clay or bentonite animal litter.

EXAMPLE 16

Example 1 and 2 are repeated except that the system also contains both 25% by volume of dehydrated alfalfa and 25% by volume of a commercial clay or bentonite animal litter.

EXAMPLE 17

Examples 1 and 2 are repeated except that foamed phenolic resin is employed.

EXAMPLE 18

Examples 1 and 2 are repeated except that cellular cellulose acetate resin is employed.

In summary, the products of this invention provide a system for treating animal wastes with light, bulky, absorbing and/or adsorbing high surface area materials which when treated with antioxidants, bactericides, etc. inhibit the breakdown of excrement into odiferous products. They can be dyed to any desired color. The use of suitable foamed plastic auxiliary agents produces animal litter of which the above is intended to be illustrative and non-limiting.

Having thus described my invention what I claim as new and desire to obtain by Letters Patent is:

1. An animal litter excrement control system comprising foamed hydrophilic organic resin plastic in particulate form.

2. The animal litter excrement control system of claim 1 wherein said plastic has been pretreated to enhance the water adsorbing properties, the water absorbing properties or the water adsorbing and absorbing properties.

3. The animal litter excrement control system of claim 1 which contains an agent capable of inhibiting the breakdown of excrement into odiferous products.

4. The animal litter excrement control system of claim 2 which contains an agent capable of inhibiting the breakdown of excrement into odiferous products.

5. The animal litter excrement control system of claim 1 admixed with other animal litters including clays, chlorophyl-containing grasses or clays and chlorophyl-containing grasses.

6. The animal litter excrement control system of claim 2 admixed with other animal litters including clays, chlorophyl-containing grasses or clays and cholorophyl-containing grasses.

7. The animal litter excrement control system of claim 3 admixed with other animal litters including clays, chlorophyl-containing grasses or clays and chlorophyl-containing grasses.

8. The animal litter excrement control system of claim 4 admixed with other animal litters including clays, chlorophyl-containing grasses or clays and chlorophyl-containing grasses.

9. The animal litter excrement control system of claim 1 wherein said foamed hydrophilic organic resin plastic in particulate form is a polystyrene, a polyurethane, a phenolic resin, polyvinylchloride, cellular cellulose acetate or mixtures thereof.

* * * * *